United States Patent
Chen

(10) Patent No.: US 9,527,447 B2
(45) Date of Patent: Dec. 27, 2016

(54) MULTIFUNCTIONAL REARVIEW MIRROR STRUCTURE OF MOTORCYCLE

(71) Applicant: NAVSTAR ELECTRONICS CO., LTD., New Taipei (TW)

(72) Inventor: Chi-Hsiu Chen, New Taipei (TW)

(73) Assignee: NAVSTAR ELECTRONICS CO., LTD., New Taipei (TW)

( * ) Notice: Subject to any disclaimer, the term of this patent is extended or adjusted under 35 U.S.C. 154(b) by 95 days.

(21) Appl. No.: 14/708,288

(22) Filed: May 10, 2015

(65) Prior Publication Data

US 2016/0325685 A1 Nov. 10, 2016

(51) Int. Cl.
*H05K 5/00* (2006.01)
*B60R 1/12* (2006.01)
*G01S 19/42* (2010.01)
*B60R 1/06* (2006.01)
*B62J 29/00* (2006.01)
*G01C 21/26* (2006.01)

(52) U.S. Cl.
CPC . *B60R 1/12* (2013.01); *B60R 1/06* (2013.01); *B62J 29/00* (2013.01); *G01C 21/26* (2013.01); *G01S 19/42* (2013.01); *B60R 2001/1261* (2013.01)

(58) Field of Classification Search
CPC ...... G06F 1/181; G06F 1/1632; G06F 1/1656; H05K 7/1418; B60J 3/0282; B60R 1/04; B06R 1/082
USPC ....... 361/728–730, 727, 756, 752, 796, 800; 359/844, 881, 872, 877
See application file for complete search history.

(56) References Cited

U.S. PATENT DOCUMENTS

| | | | | |
|---|---|---|---|---|
| 6,070,846 A * | 6/2000 | Shimokobe | ............. | F16F 7/108 248/475.1 |
| 7,370,983 B2 * | 5/2008 | DeWind | ................ | B60K 35/00 359/844 |
| 8,356,948 B2 * | 1/2013 | Onishi | .................... | B60R 11/04 396/419 |
| 9,317,742 B2 * | 4/2016 | Kramer | ................... | B60K 35/00 |
| 2006/0050018 A1 * | 3/2006 | Hutzel | .................... | B60K 35/00 345/60 |
| 2011/0080481 A1 * | 4/2011 | Bellingham | ............. | B60R 1/12 348/148 |
| 2012/0181315 A1 * | 7/2012 | Lai | .......................... | B60R 11/00 224/567 |

* cited by examiner

*Primary Examiner* — Hung S Bui
(74) *Attorney, Agent, or Firm* — Leong C. Lei

(57) ABSTRACT

A multifunctional motorcycle rearview mirror structure includes a rearview mirror and a journey data recorder. The rearview mirror is mounted to a motorcycle and has a major surface that forms a mirror surface in which a display is mounted and an opposite major surface in which a coupling trough including two first electrical conduction sections is formed and includes a control module and a GPS signal transmitter/receiver unit mounted therein. The journey data recorder is removably coupled to the coupling trough of the rearview mirror and includes two second electrical conduction sections respectively corresponding to the first electrical conduction sections. As such, the journey data recorder is coupled to the coupling trough of the rearview mirror with electrical engagement established between the first and second electrical conduction sections. The GPS signal transmitter/receiver unit receives a GPS signal to achieve GPS navigation that is displayable on the display.

5 Claims, 5 Drawing Sheets

MULTIFUNCTIONAL REARVIEW MIRROR STRUCTURE OF MOTORCYCLE

TECHNICAL FIELD OF THE INVENTION

The present invention relates generally to a multifunctional rearview mirror structure of a motorcycle, and more particularly to a motorcycle rearview mirror featuring global positioning system (GPS) based navigation, detection of speed photo radar, and journey data recording.

DESCRIPTION OF THE PRIOR ART

The progress of science and technology brings various automobile-related electronics that help improve driving/driving safety. An example is a journey data recorder.

The known journey data recorder is operable to record, in a stop condition or moving condition of an automobile, outside images that are stored for subsequent use in determining reliability and responsibility of traffic accidents.

Most of the journey data recorders are installed inside an automobile and are thus protected from burglary and unauthorized operation and damage. In addition, such an installation allows the journey data recorder to be readily connected to a power socket of the automobile, such as a cigarette lighter socket for supply of electrical power to the journey data recorder.

However, in a case where a journey data recorder is installed on a motorcycle, since the journey data recorder is installed in an exposed space, which is not enclosed, the journey data recorder may be readily stolen or damaged. Further, most of the motorcycles are not provided with a power socket, such as a cigarette lighter socket, an additional arrangement is necessary for supply of electrical power to the journey data recorder for an extended period of recording.

Thus, the present invention aims to provide a solution for combining a journey data recorder with a rearview mirror of a motorcycle with proper supply of electrical power thereto and also for providing the motorcycle rearview mirror with additional functionality of for example GPS navigation.

SUMMARY OF THE INVENTION

An object of the preset invention is to provide a multifunctional motorcycle rearview mirror structure, which comprises a rearview mirror and a journey data recorder. The rearview mirror is mounted to a motorcycle and has a major surface forming a mirror surface in which a display is mounted and an opposite major surface in which a coupling trough is formed and comprises two first electrical conduction sections mounted therein and comprises a control module and a GPS signal transmitter/receiver unit arranged therein. The control module is electrically connected to the two first electrical conduction sections, the display, and the GPS signal transmitter/receiver unit. The control module is also in electrical connection with an electrical power supply module (such as a storage batter) arranged in the motorcycle so that the control module controls supply of electrical power to the first electrical conduction sections. The journey data recorder is removably coupled to the coupling trough of the rearview mirror and comprises two second electrical conduction sections. The second electrical conduction sections correspond to and are engageable with the first electrical conduction sections. As such, the journey data recorder is coupled to the coupling trough of the rearview mirror in such a way that through the engagement established between the first and second electrical conduction sections, the journey data recorder may be charged or be supplied with electrical power from the electrical power supply module of the motorcycle. Further, a user, when stepping away from the motorcycle, may remove the journey data recorder from the coupling trough of the rearview mirror to allow the journey data recorder to be carried personally for video recording and storage. The GPS signal transmitter/receiver unit is operable to receive/transmit a GPS positioning signal, which is transmitted by the control module to the display, so as to allow the display of the rearview mirror to display GPS navigation information.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
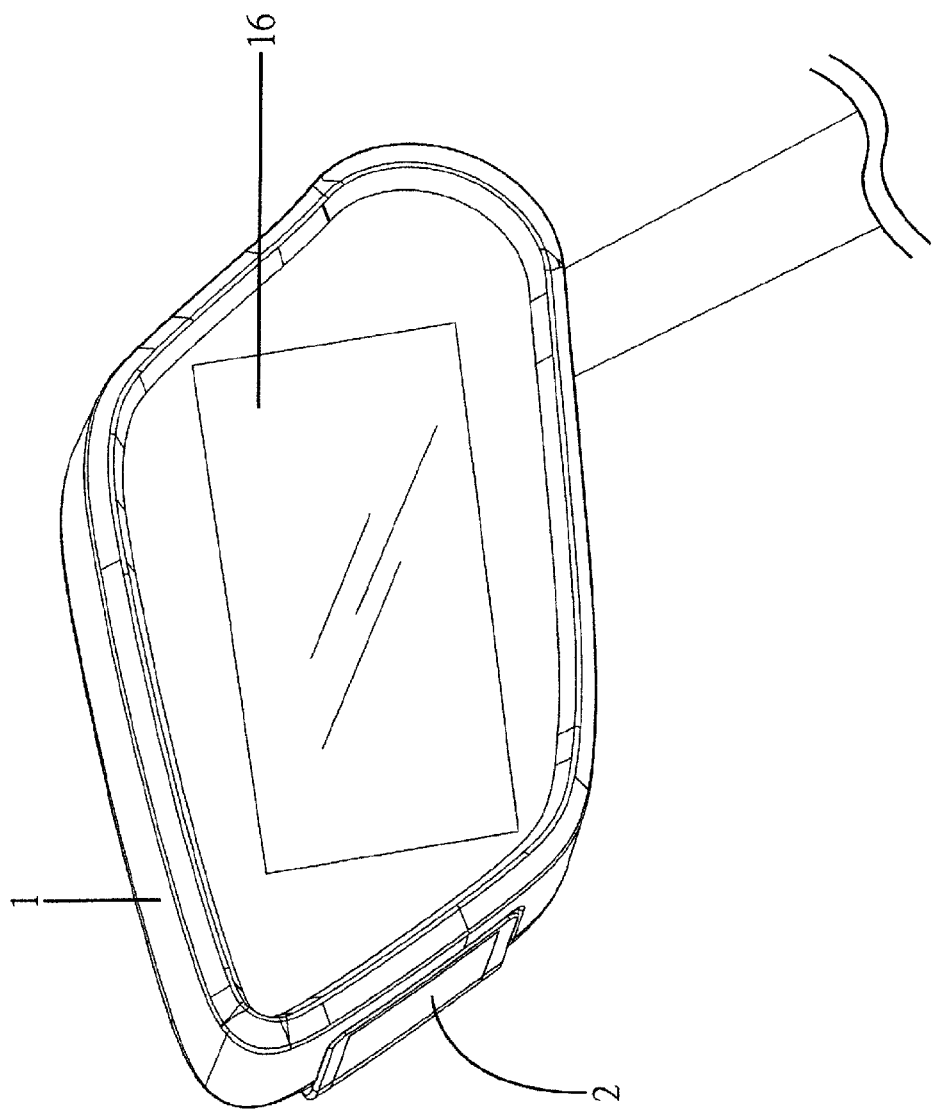
FIG. 1 is a perspective view, taken from the front side, showing a rearview mirror of a motorcycle according to the present invention.
Figure 2:
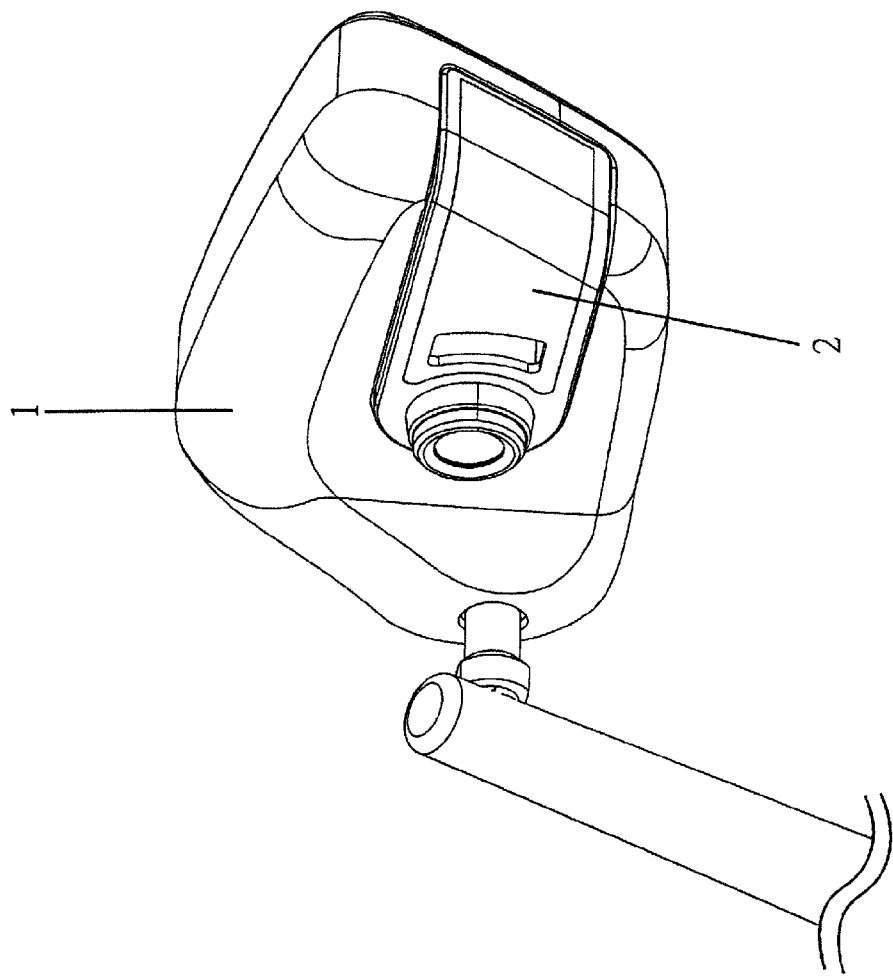
FIG. 2 is a perspective view, taken from the rear side, showing a rearview mirror of a motorcycle according to the present invention.
Figure 3:
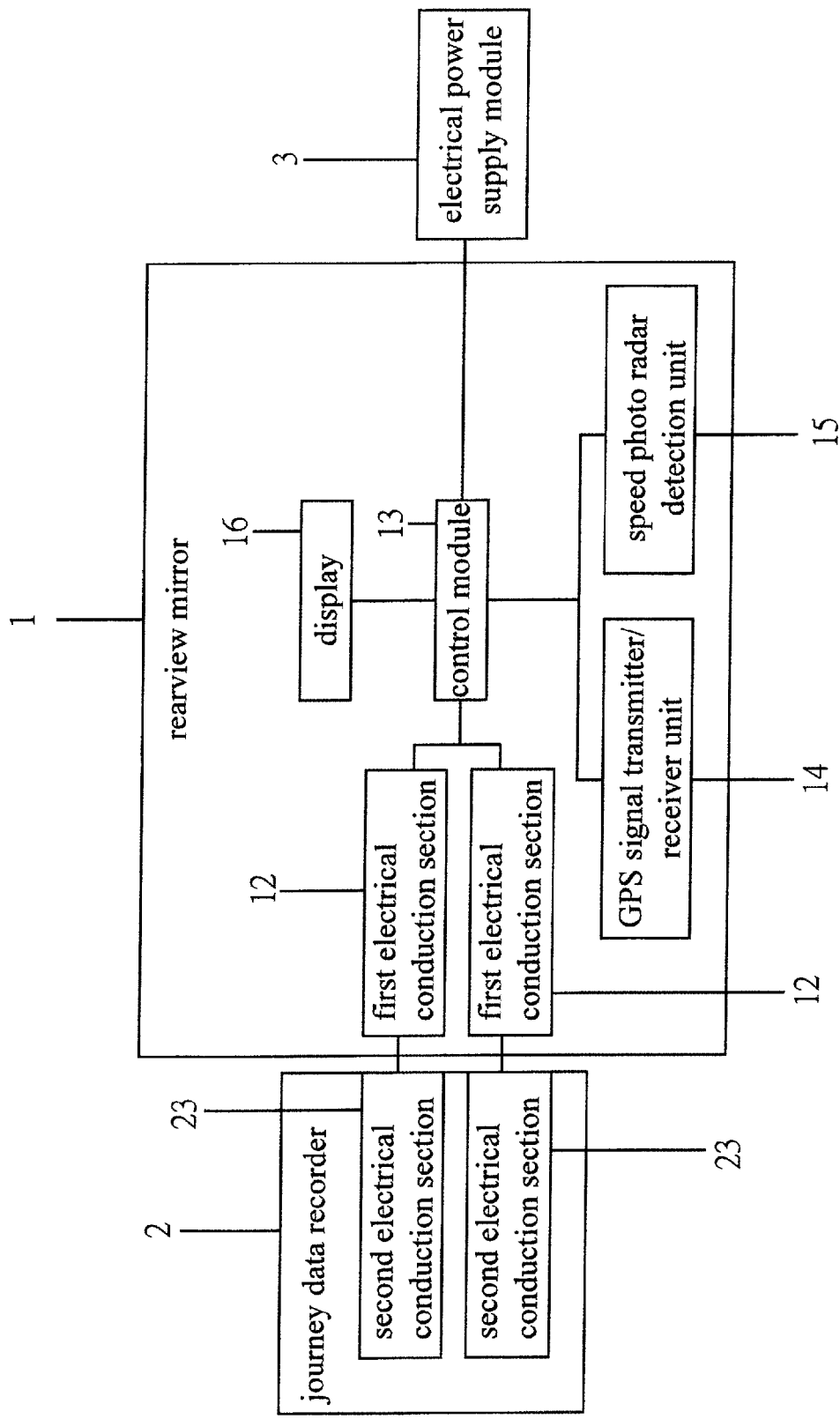
FIG. 3 is a block diagram showing the structure of the motorcycle rearview mirror according to the present invention.
Figure 4:
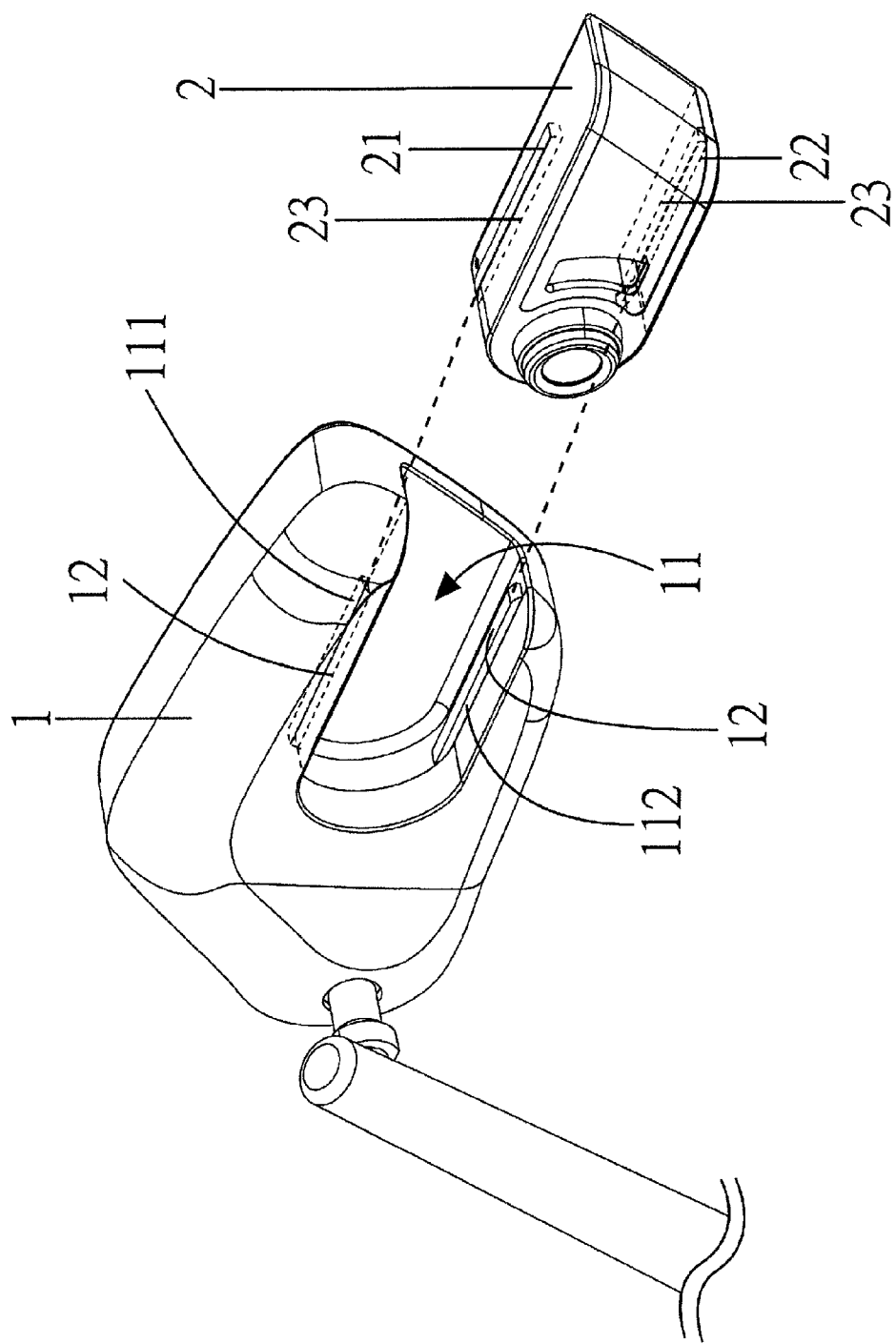
FIG. 4 is a schematic view illustrating a first example of embodying the motorcycle rearview mirror according to the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-5, the present invention provides a multifunctional motorcycle rearview mirror structure, which comprises a rearview mirror 1 and a journey data recorder 2.

The rearview mirror 1 is mounted to a motorcycle. The rearview mirror 1 has a major surface on which a mirror surface is formed and an opposite major surface that is recessed, partly, to form a coupling trough 11. The mirror surface comprises a display 16 provided therein. The coupling trough 11 comprises a first slide rail 111 and a second slide rail 112 formed therein and preferably opposite to each other. The first slide rail 111 and the second slide rail 112 are each provided therein with a first electrical conduction section 12. The rearview mirror 1 comprises, mounted in an interior space thereof, a control module 13, a global positioning system (GPS) signal transmitter/receiver unit 14, and a speed photo radar detector unit 15. The control module is arranged in electrical connection with the two first electrical conduction sections 12, the display 16, the GPS signal transmitter/receiver unit 14, and the speed photo radar detector unit 15. The control module is operable to process at least one kind of control signal. The GPS signal transmitter/receiver unit 14 is operable to transmit and receive a control signal of a GPS satellite. The speed photo radar detector unit 15 is operable to detect at least one kind of speed detection radar.

The journey data recorder 2 is combined, in a removable mariner, to the rearview mirror 1. The journey data recorder 2 is movably received and retained in and thus coupled to the coupling trough 11 of the rearview mirror 1. The journey data recorder 2 has an outside configuration that comprises a first sidewall 21 and a second sidewall 22, which are preferably opposite to each other, and also comprises a second electrical conduction section 23 formed on each of the first sidewall 21 and the second sidewall 22. The journey data recorder 2 is structured such that the first sidewall 21 and the second sidewall 22 thereof respectively correspond to the first slide rail 111 and the second slide rail 112 of the rearview mirror 1 and thus the second electrical conduction sections 23 of the journey data recorder 2 respectively correspond to and are engageable with the first electrical conduction sections 12 of the rearview mirror 1.

The journey data recorder 2 may be of an internal structure and functionalities that are well known and do not constitute novel parts of the present invention, so that no further detail is necessary herein. Further, the second electrical conduction sections 23 of the journey data recorder 2 are in electrical connection with a battery module contained in the journey data recorder 2.

The motorcycle comprises at least one electrical power supply module 3 (such as a storage batter). The control module 13 of the rearview mirror 1 is electrically connected to the electrical power supply module 3 so that the control module 13 controls supply of electrical power from the electrical power supply module 3 to the first electrical conduction section 12. When the second electrical conduction sections 23 of the journey data recorder 2 are set in engagement with the first electrical conduction sections 12 of the rearview mirror 1, supplying or charging the journey data recorder 2 with electrical power may be achieved with electrical power supplied from the electrical power supply module 3.

Figure 5:
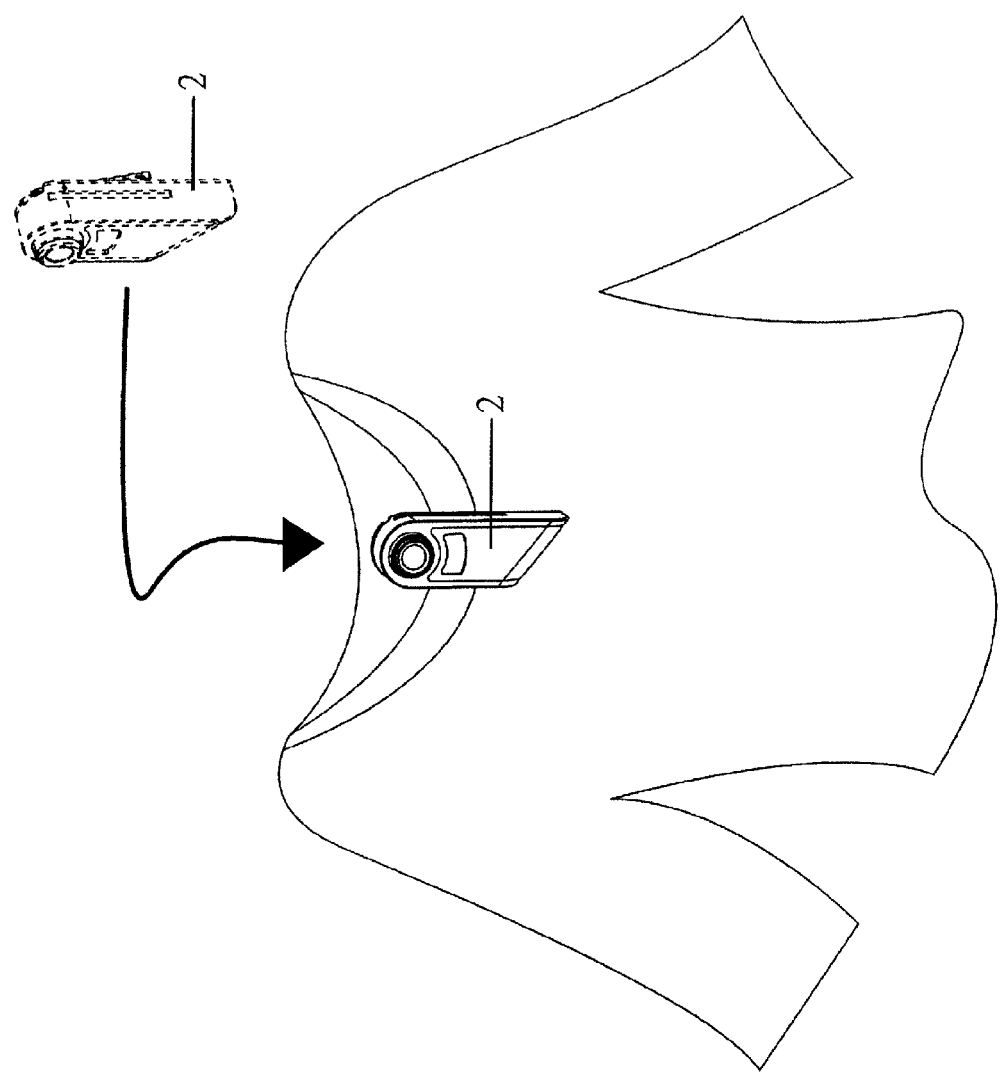
FIG. 5 is a schematic view illustrating a second example of embodying the motorcycle rearview mirror according to the present invention.

The journey data recorder 2 is received in and coupled to the coupling trough 11 of the rearview minor 1 so that the journey data recorder 2 is fixedly mounted to the rearview mirror 1 and the second electrical conduction sections 23 of the journey data recorder 2 are set in engagement with the first electrical conduction sections 12 of the rearview mirror 1 to allow the electrical power supply module 3 of the motorcycle to charge or supply electrical power to the journey data recorder 2, enabling the journey data recorder 2 for operation in an extended period for recording and storage of video images. Further, a user, when stepping away from the motorcycle, may remove the journey data recorder 2 from the coupling trough 11 of the rearview mirror 1 and may further attach the journey data recorder 2 to the body for carrying and also for additional recording and storage of video image (as shown in FIG. 5). This eliminates the risk of maintaining the journey data recorder 2 on the motorcycle to be readily stolen or damaged by malignant persons.

The control module 13 of the rearview mirror 1 may be loaded, in advance, with GPS navigation maps. The GPS signal transmitter/receiver unit 14 may receive/transmit the control signals of the GPS satellites to allow the control module 13 to display GPS navigation information on the display 16, providing the rearview mirror 1 with the function of GPS navigation (as shown in FIG. 1).

The speed photo radar detector unit 15 of the rearview mirror 1 may be operable to detect at least one kind of speed photo radars installed at the road sides or a police car and the information of the detection result may be displayed by the control module 13 on the display 16, providing the rearview mirror 1 with a function of detecting speed photo radars.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A multifunctional motorcycle rearview mirror structure, comprising:
  a rearview mirror, which is adapted to be mounted to a motorcycle, which comprises at least one electrical power supply module, the rearview mirror having a major surface on which a mirror surface is formed and an opposite major surface in which a coupling trough is formed, the mirror surface comprising a display formed therein, the coupling trough comprising two first electrical conduction sections mounted therein, the rearview mirror comprising a control module and a global positioning system (GPS) signal transmitter/receiver unit mounted therein, the control module being in electrical connection with the two first electrical conduction sections, the display, the GPS signal transmitter/receiver unit, and the electrical power supply module, the control module being operable to process at least one control signal, the GPS signal transmitter/receiver unit being adapted to receive and transmit a control signal of a GPS satellite; and
  a journey data recorder, which is removably coupled to the rearview mirror, the journey data recorder being moveable received and retained in the coupling trough, the journey data recorder having an outer configuration comprising two second electrical conduction sections, the two second electrical conduction section corresponding to and being electrically engageable with the two first electrical conduction sections.

2. The motorcycle rearview mirror structure according to claim 1, wherein the coupling trough comprises a first slide rail and a second slide rail mounted therein and opposite to each other, the two first electrical conduction sections being respectively mounted on the first slide rail and the second slide rail, the journey data recorder comprising a first sidewall and a second sidewall formed on the outside configuration thereof and opposite to each other, the two second electrical conduction sections being respectively mounted to the first sidewall and the second sidewall, the first sidewall and the second sidewall respectively corresponding to the first slide rail and the second slide rail so that the two second electrical conduction sections are corresponding to and are electrically engageable with the two first electrical conduction sections.

3. The motorcycle rearview mirror structure according to claim 1, wherein the rearview mirror comprises a speed photo radar detector unit mounted therein, the speed photo radar detector unit being electrically connected with the control module, the speed photo radar detector unit being adapted to detect at least one speed photo radar.

4. The motorcycle rearview mirror structure according to claim 1, wherein the journey data recorder comprises a battery module, the second electrical conduction sections being in electrical connection with the battery module.

5. The motorcycle rearview mirror structure according to claim 1, wherein the electrical power supply module comprises a storage battery.

\* \* \* \* \*